United States Patent
Usuki et al.

(10) Patent No.: US 11,898,908 B2
(45) Date of Patent: Feb. 13, 2024

(54) ATTENUATED TOTAL REFLECTION MEASURING APPARATUS CAPABLE OF RAMAN SPECTRAL MEASUREMENT

(71) Applicant: JASCO CORPORATION, Tokyo (JP)

(72) Inventors: Masateru Usuki, Tokyo (JP); Yoshiko Kubo, Tokyo (JP); Daisuke Dogomi, Tokyo (JP); Kento Aizawa, Tokyo (JP); Tsutomu Inoue, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 0 days.

(21) Appl. No.: 17/979,908

(22) Filed: Nov. 3, 2022

(65) Prior Publication Data
US 2023/0145637 A1 May 11, 2023

(30) Foreign Application Priority Data
Nov. 5, 2021 (JP) ................. 2021-181521

(51) Int. Cl.
*G01J 3/44* (2006.01)
*G01J 3/02* (2006.01)
*G01N 21/552* (2014.01)
*G01J 3/14* (2006.01)

(52) U.S. Cl.
CPC .............. *G01J 3/0208* (2013.01); *G01J 3/14* (2013.01); *G01J 3/4412* (2013.01); *G01N 21/552* (2013.01)

(58) Field of Classification Search
CPC .......... G01J 3/0208; G01J 3/14; G01J 3/4412; G01J 3/0291; G01N 21/552; G01N 2021/3595; G01N 21/65
See application file for complete search history.

(56) References Cited

U.S. PATENT DOCUMENTS

| | | | |
|---|---|---|---|
| 9,041,923 B2 * | 5/2015 | Messerchmidt | G01N 21/552 356/73 |
| 11,137,290 B2 | 10/2021 | Ota | |
| 11,579,089 B2 | 2/2023 | Aizawa et al. | |
| 2002/0190213 A1 * | 12/2002 | Bynum | G01N 33/15 250/341.8 |
| 2021/0164838 A1 | 6/2021 | Ota | |

FOREIGN PATENT DOCUMENTS

WO   WO2019/092772   5/2019

* cited by examiner

*Primary Examiner* — Abdullahi Nur
(74) *Attorney, Agent, or Firm* — GREENBLUM & BERNSTEIN, P.L.C.

(57) ABSTRACT

An Attenuated total reflection measuring apparatus capable of Raman spectral measurement has an infrared optical instrument and a Raman module. The infrared optical instrument is disposed on an ATR prism side of a sample, and is provided to irradiate the ATR prism with an infrared light, and collect the infrared light from the ATR prism. The Raman module is disposed on a side opposite to the ATR prism side relative to the sample, and has a guide tube that outputs an excitation light from an excitation light source to the sample, and a lens portion disposed inside thereof. An end of the guide tube is in a position to push the sample to the ATR prism. The Raman module has a lens position adjustment mechanism that moves the lens portion along an optical axis, and a spectroscope that detects a Raman scattering light collected by the lens portion.

7 Claims, 9 Drawing Sheets

Showing focusing point upon acquiring spectrum of sample
(A)

FIG. 4B

Showing focusing point upon acquiring spectrum of ATR prism
(B)

ATTENUATED TOTAL REFLECTION MEASURING APPARATUS CAPABLE OF RAMAN SPECTRAL MEASUREMENT

RELATED APPLICATION

This application claims the priority of Japanese Patent Application No. 2021-181521 filed on Nov. 5, 2021, the disclosure of which is incorporated herein by reference in its entirety.

TECHNICAL FIELD

The present invention relates to an Attenuated total reflection (ATR) measuring apparatus capable of performing Raman spectral measurement simultaneously.

BACKGROUND ART

The ATR accessory for Fourier-transform infrared spectrometer (FTIR) described in Patent Literature 1 is an apparatus capable of performing Attenuated total reflection measurement and Raman spectral measurement simultaneously. In the ATR accessory, an optical fiber for Raman measurement is embedded into a pressure bar on a sample stage. An excitation light from the end of the fiber irradiates the sample, and the ATR accessory collects Raman scattering light from the sample through the end of the fiber to detect the same with a Raman detection mechanism.

CITATION LIST

Patent Literature

Patent Literature 1: International Publication No. WO2019/092772

SUMMARY OF INVENTION

Technical Problem

However, in the Attenuated total reflection measuring apparatus of Patent Literature 1, an irradiation range of the excitation light emitted from the optical fiber is widened. Accordingly, it was problematic in the point that, upon measuring a small amount of a sample or a thin sample by Raman spectral measurement, a Raman peak derived from the ATR prism embedded into the stage overlaps the measurement result.

The object of the present invention is to provide an Attenuated total reflection measuring apparatus capable of performing Raman spectral measurement simultaneously, the Attenuated total reflection measuring apparatus capable of performing Raman spectral measurement while suppressing influence of a Raman peak derived from an ATR prism.

Solution to Problem

That is, the Attenuated total reflection measuring apparatus according to the present invention performs Attenuated total reflection measurement by bringing an Attenuated total reflection crystal (ATR crystal) having a refractive index higher than that of a sample into contact with the sample, the apparatus comprises an infrared optical instrument and a Raman spectroscopy instrument, wherein:

the infrared optical instrument is disposed on the ATR crystal side of the sample, and is provided to irradiate the ATR crystal with an infrared light and collect the infrared light from the ATR crystal;

the Raman spectroscopy instrument is disposed on a side opposite to the ATR crystal side relative to the sample, and comprises an excitation light source that emits an excitation light, a guide tube having a cylindrical shape that outputs the excitation light from an end of the guide tube to the sample, and a lens portion that is disposed inside the guide tube and collects the excitation light toward the end of the guide tube;

the end of the guide tube is provided at a position to push the sample to the ATR crystal; and the Raman spectroscopy instrument further comprises a lens position adjustment mechanism for moving the lens portion along an excitation optical axis of the excitation light, and a spectroscope provided to spectrally disperse a Raman scattering light collected by the lens portion from the sample to detect the spectrally dispersed Raman scattering light.

This configuration is characterized in that the infrared optical instrument including the ATR crystal and the Raman spectroscopy instrument for Raman spectral measurement are disposed at positions interposing the sample. That is, since the end of the guide tube of the Raman spectroscopy instrument is disposed at the position to push the sample toward the ATR crystal, ATR measurement can be performing while the sample is in contact with the ATR crystal. Moreover, the excitation light from the guide tube irradiates the sample, and the Raman scattering light from the sample is collected by the guide tube, so that Raman spectral measurement can also be performed. Therefore, ATR measurement and Raman spectral measurement can be performed simultaneously.

In addition, since Raman spectral measurement is performed while the end of the guide tube is in contact with the sample, an external light coming into the guide tube can be blocked and Raman spectral measurement can be performed while influence of the external light is suppressed in a space where light is blocked.

Furthermore, the lens portion can be moved by the lens position adjustment mechanism, and, for example, the position of the lens portion can be adjusted to match the focusing position of the excitation light with the surface or inside of the sample; therefore, it becomes easier to avoid a Raman peak derived from the ATR crystal to overlap with the result of Raman spectral measurement.

Moreover, it is preferred that the lens portion is fixed to a lens tube configuring a double cylindrical structure with the guide tube, the lens position adjustment mechanism comprises a movable material that moves along the excitation optical axis, and a fixing material that supports the movable material, the lens tube is retained to the movable material, and the guide tube is retained to the fixing material.

In this configuration, since the lens tube is retained to the movable material of the lens position adjustment mechanism and the guide tube is retained to the fixing material of the lens position adjustment mechanism, the double-cylindrical structure of the lens tube and the guide tube is disposed on the sample side of the lens position adjustment mechanism. Therefore, the position of the lens position adjustment mechanism is away from the sample for the length of the tubes. Since the double-cylindrical structure of the lens tube and the guide tube does not comprise the lens position adjustment mechanism and can be made as thin as possible, a measurer can easily see and confirm the contact state of the guide tube and the sample, and the position of the Raman spectroscopy instrument can be easily adjusted.

Moreover, it is preferred that the lens tube is provided such that the position of the lens tube can be adjusted by the lens position adjustment mechanism so that the lens portion fixed to the end of the lens tube or the end of the lens tube comes into a position to push the sample to the ATR crystal.

In this configuration, both of the tubes configuring the double-cylindrical structure can be brought into contact with the sample. As for the lens tube, the position of the lens tube may be adjusted by the lens position adjustment mechanism such that either of the end of the lens tube or the lens portion fixed to the end of the lens tube comes into contact with the sample. Accordingly, the contact state of the sample and the ATR crystal can be made more certain, and a better result can be achieved in the ATR measurement.

Moreover, it is preferred that the lens tube is detachably retained to the movable material, and the guide tube is detachably retained to the fixing material.

In this configuration, if both of the two tubes configuring the double-cylindrical structure are detachable, the tubes can be exchanged easily, and also the tubes can be changed to tubes of different lengths easily. Moreover, as for the lens tube, it can be selected from lens portions of a plurality of types easily, and as for the guide tube, materials or shapes of the pressing part of the end of the guide tube can be changed in accordance with the sample easily.

Moreover, it is preferred that the lens position adjustment mechanism is configured such that the position of the sample and the position of the ATR crystal are within an adjustment range of the position of a focusing point of the lens portion.

In this configuration, since the position of the focusing point of the excitation light upon Raman spectral measurement can be adjusted to the positions of the sample and the ATR crystal, a differential spectrum between these spectra can be calculated. Accordingly, in a case of a sample of which a fluorescence from the ATR crystal may affect Raman measurement, a Raman peak derived from the ATR crystal can be eliminated effectively.

Moreover, since the position of the focusing point can be set to a position closer to the sample than the position of the end of the guide tube, Raman spectral measurement can be performed to the inner part of the sample. Furthermore, in a case of which a cap is put onto the end of the guide tube to improve the contact state of the ATR crystal and the sample and is pressed to the sample, the focusing point can be set to the sample by moving the position of the focusing point to the sample for the thickness of the cap; therefore, Raman spectral measurement can be performed while the cap is put on.

Moreover, it is preferred that the shape of the lens portion is a hemisphere or a sphere, and the lens portion is provided to be position adjustable by the lens position adjustment mechanism such that the lens portion comes into a position to push the sample to the ATR crystal.

Moreover, it is preferred that the Raman spectroscopy instrument comprises:

a collimating lens position adjustment mechanism that adjusts the position of a collimating lens disposed at an exit of the excitation light source in a direction of the optical axis of the excitation light; and an imaging lens position adjustment mechanism that adjusts the position of an imaging lens disposed in front of the spectroscope in a direction of the optical axis of the Raman scattering light.

In this configuration, a half-ball lens or a ball lens is used, so that a lens having a large numerical aperture and a short back focus (BFL) can be selected easily. Accordingly, even when the lens portion is pressed to a sample of a small amount or a thin sample, the focusing point of the excitation light can be set to the sample by operating the collimating lens position adjustment mechanism and the imaging lens position adjustment mechanism, and the Raman scattering light of such sample can be measured. In addition, measurement with excellent confocality can be performed when the numerical aperture of the lens portion is large; therefore, a Raman peak derived from the ATR crystal can be more easily avoided from overlapping with the result of Raman spectral measurement.

DESCRIPTION OF EMBODIMENTS

Embodiments of an ATR accessory (corresponds to the Attenuated total reflection measuring apparatus) according to the present invention are described in detail with reference to the drawings.

Figure 1:
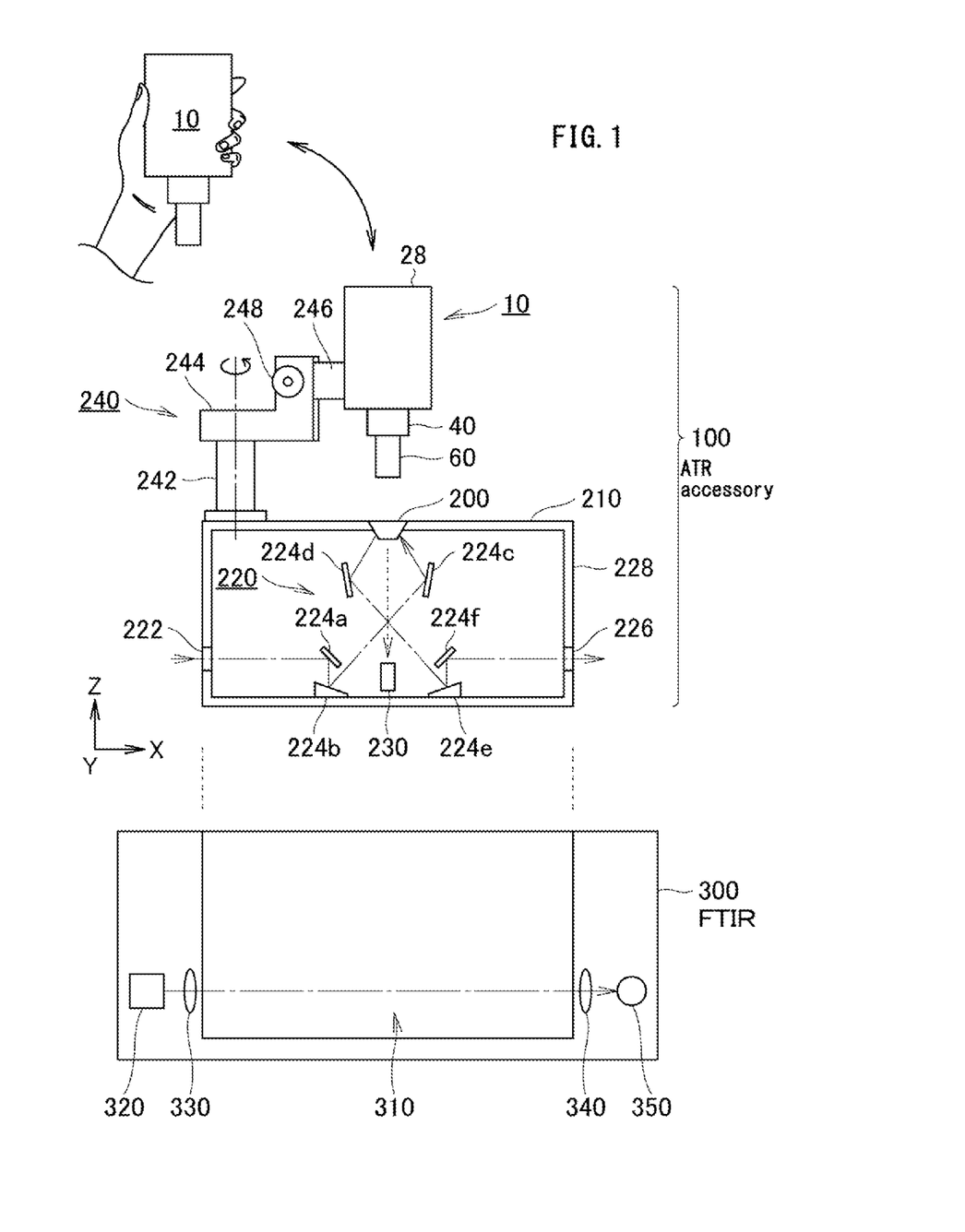
FIG. 1 illustrates a whole configuration of an ATR accessory according to a first embodiment.

FIG. 1 is a schematic drawing that illustrates a configuration of an ATR accessory 100 according to a first embodiment. The ATR accessory 100 is an accessory for a Fourier-transform infrared spectrometer (FTIR) 300 used to perform Attenuated total reflection measurement by bringing an ATR prism (corresponds to an ATR crystal) 200 having a refractive index higher than a sample into contact with the sample, and is installed to a sample chamber 310 of the FTIR 300.

As shown in FIG. 1, the ATR accessory 100 has: the ATR prism 200 that is fit to a hole at the center of a stage 210; an infrared optical instrument 220 that is disposed underneath the stage 210; an elevating equipment 240 on the stage 210; and a Raman module (corresponds to Raman spectroscopy instrument) 10 detachably mounted to a moving part (lifter) of this elevating equipment 240.

<Infrared Optical Instrument>

The infrared optical instrument 220 has a light receiving window 222 of an infrared light, a plurality of reflecting mirrors 224a to 224f, and a light emitting window 226 of the infrared light, and they are disposed inside a housing 228 having the stage 210 as a top plate. The infrared light from an infrared light source 320 of the FTIR 300 is condensed by a condenser lens 330 in front of the light receiving window 222 of the ATR accessory 100, and enters the housing 228 from the light receiving window 222. In the housing 228, the infrared light is reflected at the plurality of reflecting mirrors 224a to 224c on the entrance side, enters the ATR prism 200, and is totally reflected at a surface in contact with the sample inside the ATR prism 200. A totally-reflected light thereof exits the ATR prism 200, is reflected at the plurality of reflecting mirrors 224d to 224f on the exit side, and exits from the light emitting window 226. Then, it becomes a parallel light by a collimating lens 340 disposed outside the light emitting window 226, and is sent to an infrared detector 350.

<Elevating Equipment>

Next, the elevating equipment 240 has: a column 242 that stands on the stage 210; an arm 244 supported at an upper end of the column 242; and a lifter 246 supported to be movable upward and downward having this arm 244 as a base. A commercially available product can be used as this elevating equipment 240, and one which has a mechanism of which the lifter 246 moves up and down when a measurer rotates a knob 248 may be adopted, for example. The arm 244 may be supported to be rotatable around the central axis of the column 242. The central axis of the column 242 is in a vertical direction, and is shown as Z axis in FIG. 1.

<Raman Module>

The Raman module 10 is detachably supported to the lifter 246 of the elevating equipment 240. A screw or a magnet may be used to mount the Raman module 10 to the lifter 246. The Raman module 10, which will be described in detail with reference to FIG. 2, has a module main body (housing 28), a focus adjustment mechanism (corresponds to the lens position adjustment mechanism) 40 connected to a lower end of the module main body, and a cylindrical guide tube 60 that outputs an excitation light from the lower end, and is supported to the lifter 246 in a posture of which an opening of a lower end of the guide tube 60 faces the ATR prism 200. The Raman module 10 is a size that can be held with one hand when it is taken off from the lifter 246, and is configured to be capable of performing Raman spectral measurement alone.

The measurer elevates the Raman module 10 mounted to the elevating equipment 240, and places a sample on the ATR prism 200 of the stage 210. For example, a small amount of a powder sample or a sample in form of a thin sheet is placed thereon. Then, the Raman module 10 is descended by the elevating equipment 240, and the lower end of the guide tube 60 is slowly brought into contact with the sample on the stage 210. The knob 248 of the elevating equipment 240 may be provided with a torque limiter (a mechanism of which the knob 248 idles when a torque more than the set value acts on the knob 248) such that the end of the guide tube 60 does not press the sample too hard.

The sample is not limited to a solid or a powder, and may be a liquid sample or a mixture thereof. Moreover, as for the amount of the sample, the sample ranging from a small amount of the sample placed on a placement surface to a large amount put in a container or a bag can be measured.

Figure 2:
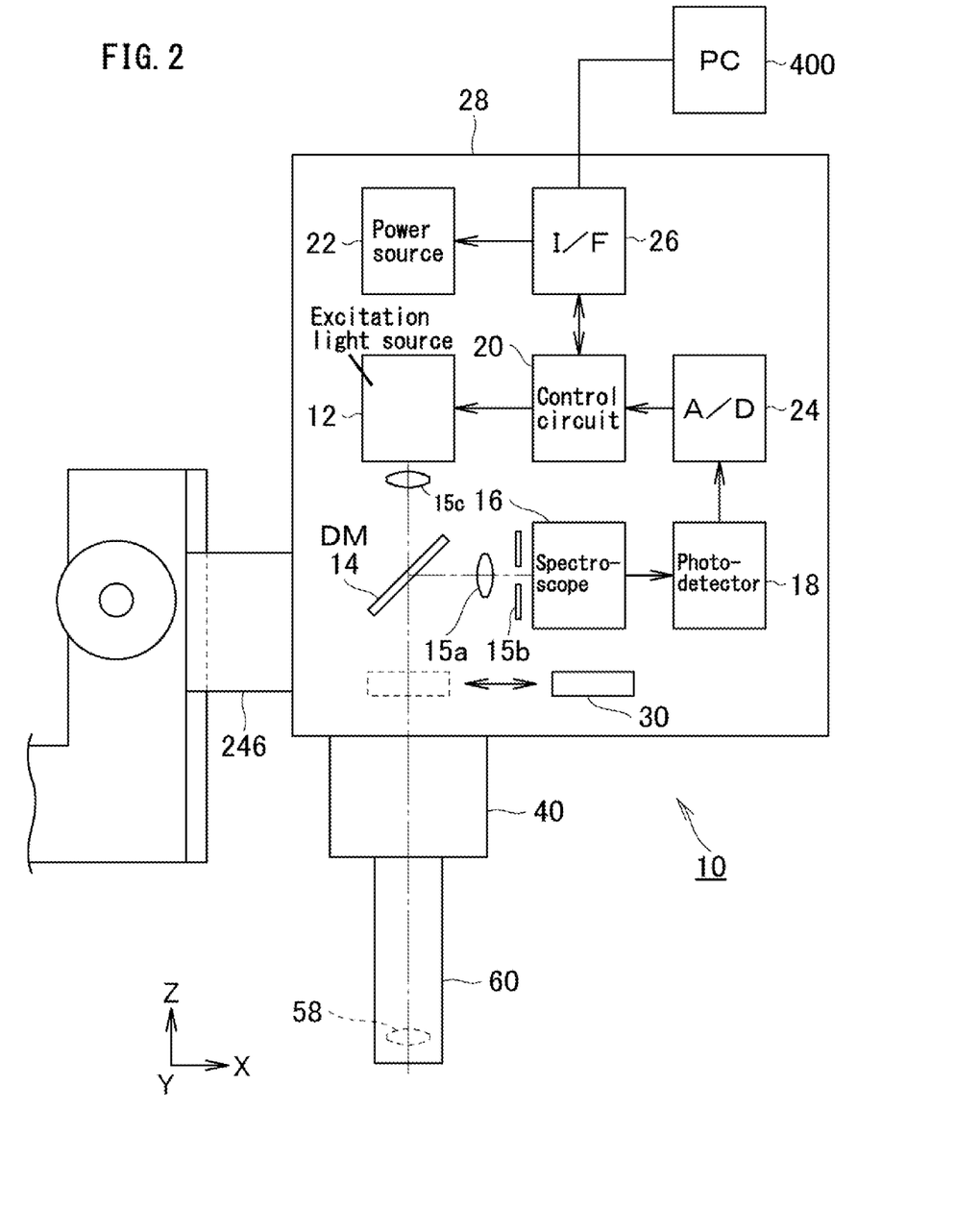
FIG. 2 illustrates a configuration of a Raman module in the ATR accessory.

As shown in FIG. 2, an excitation light source 12, a collimating lens15c, a dichroic mirror (DM) 14, a spectroscope 16, a photodetector 18, a control circuit 20 having a microprocessor and a memory, a power source 22, an analog/digital (A/D) converter 24, and a communication interface (I/F) 26 are disposed inside the housing 28 of the Raman module 10. A battery may be provided to the power source 22; however, a power supply unit (e.g., A/C adapter) may be directly provided without using a battery.

The excitation light source 12 is a laser diode or the like, and outputs a laser light as an excitation light. By providing an opening cover to the housing 28 and configuring the excitation light source 12 to be detachable, the excitation light source 12 can be easily changed to one having a wavelength in accordance with the type or form of the sample.

In the configuration of FIG. 2, the excitation light from the excitation light source 12 becomes into a parallel light by the collimating lens 15c, transmits the dichroic mirror (DM) 14, passes through the focus adjustment mechanism 40 and the guide tube 60, and irradiates the sample. A shutter 30 is provided between the DM 14 and the focus adjustment mechanism 40. The shutter 30 is closed when the Raman module 10 is not used to avoid unnecessary emission of the excitation light.

Moreover, the returned light (here, Raman scattering light (from the sample)) from the guide tube 60 passes through the focus adjustment mechanism 40, and is reflected at the DM 14. Then, it is dispersed by the spectroscope 16 via an imaging lens 15a and a slit 15b into different wavelengths, and detected as a spectral distribution of a light intensity by a CMOS image sensor or the like that configures the photodetector 18. The DM 14 is an optical element capable of separating a necessary light (Raman scattering light) from an incident light by reflecting the incident light of a specific wavelength region and transmitting other lights, and may be replaced by other optical elements having the same function.

In the present embodiment, a detector or a sensor without a cooling function is used as the photodetector 18 for miniaturization, weight-saving and power-saving; however, one having a cooling function may be used. When S/N ratio is small, measurement time may be extended to increase integration of detected signals. The detected signal from the photodetector 18 is converted into a digital signal by the A/D converter 24, and sent to the control circuit 20. The control circuit 20 calculates a spectral information of the sample based on the detected signal, and stores the same. Moreover, the control circuit 20 outputs the spectral information to an external computer (PC) 400 via the communication I/F 26 such as a USB, and can display the spectral information on its monitor. The external PC 400 may be a portable computer such as a smart phone. The portable computer may encrypt the measured spectrum of the Raman module 10 into an encrypted mail, and further send it to a server computer having an external database. The measured spectrum received by the server computer may be analyzed in detail, and the portable computer may receive the analysis result thereof and display the same on a monitor.

Figure 3:
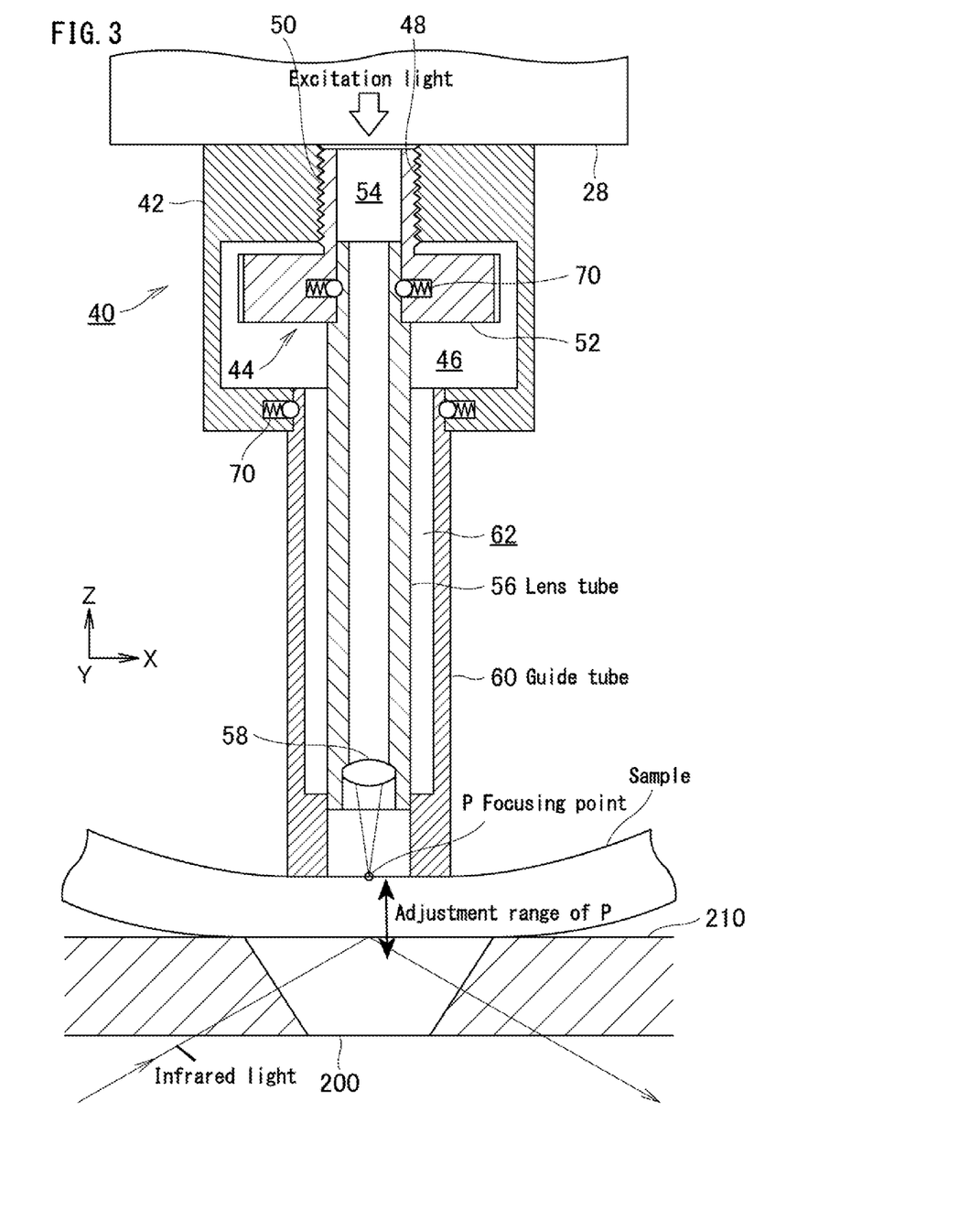
FIG. 3 illustrates a configuration of a focus adjustment mechanism of the Raman module.

FIG. 3 illustrates an example of the configuration of the focus adjustment mechanism 40 and the guide tube 60 that are connected to the housing 28 of the Raman module 10.

<Focus Adjustment Mechanism>

The focus adjustment mechanism 40 has a fixing material 42 fixed to the housing 28, and a movable material 44 supported to be movable in the Z direction relative to the fixing material 42. The fixing material 42 has a through hole 46 along the optical axis of the excitation light from the housing 28. An inner screw 48 is processed to the inner surface closer to the housing 28 of the through hole 46.

Moreover, at the central part of the through hole 46, a relatively large opening for operating a knob 52 of the movable material 44 is formed in a direction perpendicular to the Z direction.

The movable material 44 is a cylindrical material that forms the optical path of the excitation light, and an outer screw 50 that fits the inner screw 48 of the fixing material 42 is processed to the outer surface closer to the housing 28. Moreover, the knob 52 having a diameter larger than the part of the outer screw 50 is formed at the end closer to the sample of the movable material 44. At the through hole 54 of the movable material 44, a cylindrical lens tube 56 is detachably mounted from the sample side. Moreover, a lens portion (a convex lens or an achromatic lens) 58 is supported in the vicinity of the end on the sample side of the lens tube 56.

<Guide Tube>

At the through hole 46 of the fixing material 42, the guide tube 60 is detachably mounted from the sample side. The inner diameter of the end on the sample side of the through hole 62 of the guide tube 60 is small, and is formed such that the lens tube 56 can move in the Z direction when the end of the lens tube 56 is inserted.

The guide tube 60 and the lens tube 56 form a double cylindrical structure. Since the outer guide tube 60 is supported to the fixing material 42, and the inner lens tube 56 is supported to the movable material 44, the end of the lens tube 56 moves in a direction getting closer/farer to/from the sample when the measurer rotates the knob 52 to descend/elevate the movable material 44 in the Z direction. By forming the double cylindrical structure of the guide tube 60 and the lens tube 56, the focus adjustment mechanism 40 can be provided at a position away from the sample, and the double cylindrical structure can be made extremely thin. Therefore, the measurer can easily confirm the contact state of the end of the guide tube 60 and the sample, and the position of the Raman module 10 can be easily adjusted.

The excitation light (parallel light) that travels inside the lens tube 56 is collected by the lens portion 58, and forms a focusing point P at a position that is out from the end of the lens tube 56 to the sample side. The position of the focusing point of the excitation light by the lens portion 58 and the slit 15b in front of the spectroscope 16 are in a conjugated positional relationship. When the movable material 44 is in a reference position (at a position where the knob 52 is the closest to the housing 28) as shown in FIG. 3, the position of this focusing point P becomes the position of the end of the guide tube 60 exactly.

In the present embodiment, as shown in FIG. 3, the measurer operates the elevating equipment 240 to descend the Raman module 10 and press the sample to the ATR prism 200 by the lower end of the guide tube 60, so that the sample can be brought into contact with the ATR prism 200, and ATR measurement can be performed in a good condition.

Simultaneously, since the lower end of the guide tube 60 is in a position in contact with the sample, the inside of the guide tube 60 becomes blocked from light, and Raman spectral measurement can be performed without being affected by an external light.

Furthermore, the measurer can operate the focus adjustment mechanism 40 to adjust the position of the focusing point P of the lens portion 58 in the Z direction, and, in particular, the focusing point P can be adjusted to the surface or the inside of the sample, so that a peak derived from the ATR prism 200 can be avoided from overlapping with the result of Raman spectral measurement.

Therefore, ATR measurement and Raman spectral measurement can be performed simultaneously under good conditions, respectively.

Figure 4A:
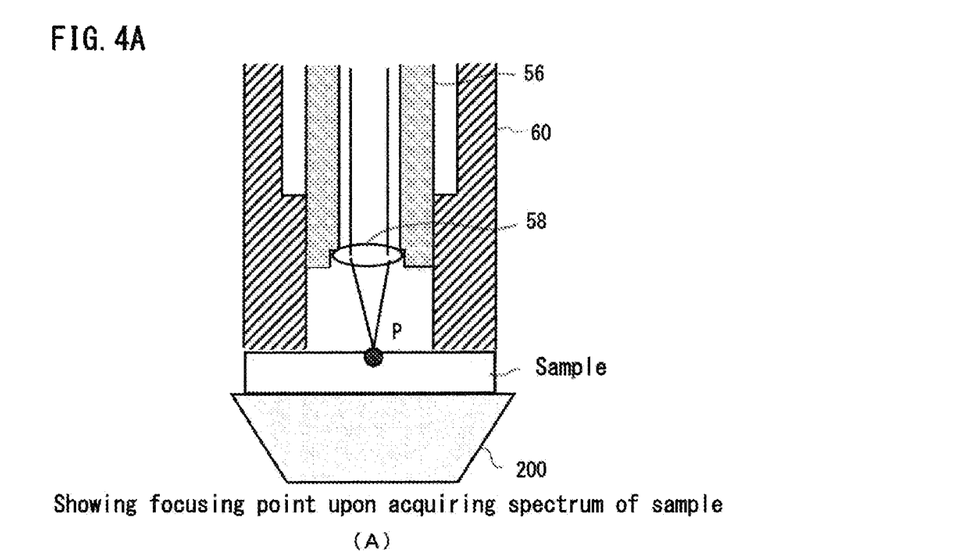
FIG. 4A illustrates a method of eliminating a peak derived from an ATR prism by a differential spectrum, and illustrates a focusing point upon acquiring a spectrum of a sample.
Figure 4B:
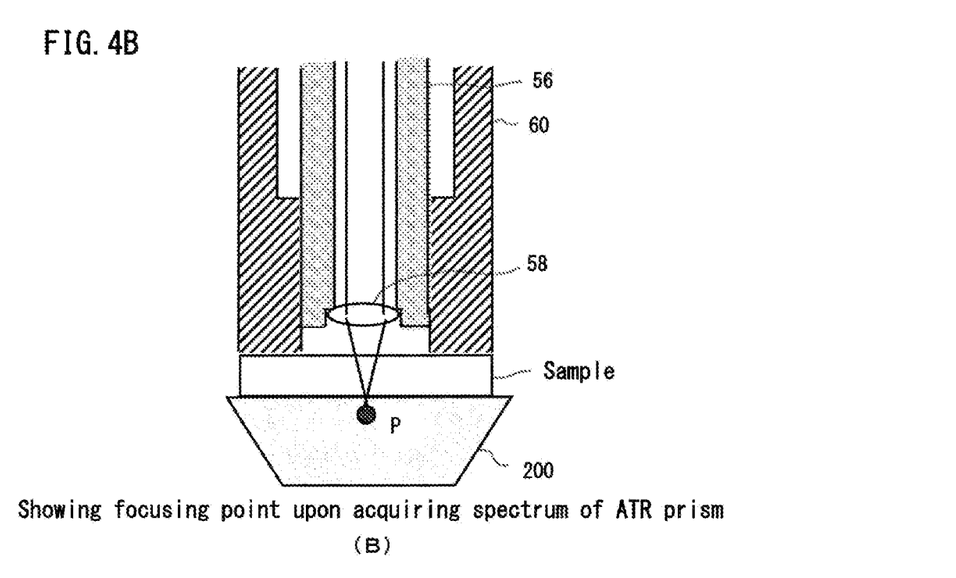
FIG. 4B illustrates a method of eliminating a peak derived from an ATR prism by a differential spectrum, and illustrates a focusing point upon acquiring a spectrum of the ATR prism.

The Raman module 10 has the collimating lens 15c at the exit of the excitation light source 12, the lens portion 58 near the sample, and the imaging lens 15a at the entrance of the spectroscope 16, and they configure a confocal optical system, so that Raman measurement with a high confocality is performed. For example, when the sample has a multiple layer structure, the focusing point P can be positioned on a measurement surface of the ATR prism 200 by operating the focus adjustment mechanism 40, and it can be consistent with ATR measurement. As shown in FIG. 4, the confocal optical system of the Raman module 10 and the focus adjustment mechanism 40 of the lens portion 58 are used to move the focusing point P of the excitation light in the optical axis direction. When a Raman peak derived from the ATR prism 200 and a Raman peak of the sample are overlapped, the position of the focusing point P is changed to measure a Raman spectrum of the sample of FIG. 4A and a Raman spectrum of the diamond ATR prism of FIG. 4B. Then, with respect to the Raman spectrum of the sample, a coefficient is multiplied to the Raman spectrum of the ATR prism to calculate the differential spectrum between the two Raman spectra, so that the Raman peak derived from the ATR prism 200 can be removed by calculation. At least two measurement points, the measurement point of the ATR prism and the measurement point of the sample, may be used.

<Pressing Cap>

Figure 5A:
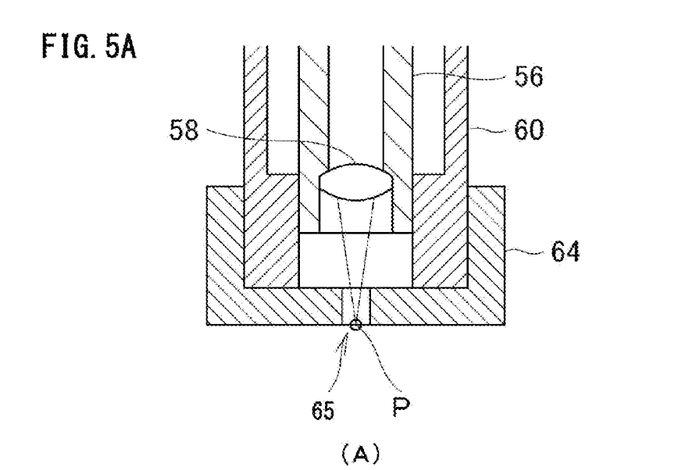
FIG. 5A illustrates a state when a pressing cap is put onto the end of the guide tube.

FIG. 5A shows a state which a pressing cap 64 is mounted to the lower end of the guide tube 60. The pressing cap 64 covers the opening of the guide tube 60, and has a hole 65 of a small diameter at the central part where the collected excitation light is output therefrom. By mounting the pressing cap 64, an area where the guide tube 60 presses the sample becomes larger, and thus the contact state of the ATR prism 200 and the sample improves. Moreover, by operating the focus adjustment mechanism 40 to adjust the position of the focusing point P of the lens portion 58 in the Z direction for the thickness of the pressing cap 64, the position of the focusing point P in the sample can be set to the same state as before the pressing cap 64 is mounted.

One that is suitably selected from pressing caps 64 having lower ends of different shapes may be used. For example, it is preferred that the measurer can choose one pressing cap 64 of which the contact surface with the sample is made of metal or resin. Moreover, it is preferred that the measurer can choose one pressing cap 64 of which the contact surface with the sample is flat or concave shape. Moreover, it is preferred that the measurer can choose one pressing cap 64 of which the contact part with the sample is flexible type so as to move freely.

<Guide Tube with a Window Plate>

Figure 5B:
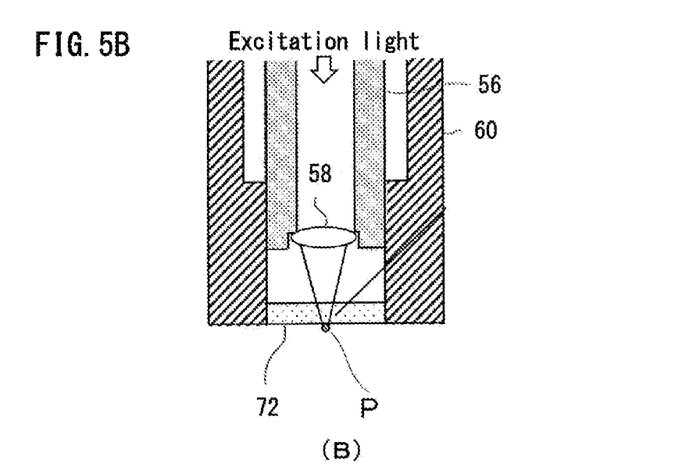
FIG. 5B illustrates a state when a window plate is fit to the end itself of the guide tube.

FIG. 5B shows a state which the opening at the lower end of the guide tube 60 is closed with a window plate 72, not with a cap. The window plate 72 is preferably made of a material such as quarts that does not emit light that may disrupt Raman spectral measurement. By mounting the window plate 72, the excitation light transmits the window plate 72, but the sample may not enter the guide tube 60 even if the sample is liquid or gel. Accordingly, the lens portion 58 inside may not be contaminated, and ATR measurement and Raman spectral measurement can be performed easily.

<Other Lens Portions>

If the numerical aperture of the lens portion (convex lens) 58 of FIG. 3 is large, the sample can be pressed with the end of the lens tube 56 by operating the focus adjustment mechanism 40 to further descend the lens tube 56. However, when the sample is in a small amount, or the thickness of the sample is thin, the focusing point P of the lens portion 58 may deviate from the sample; therefore, attention needs to be paid for the result of Raman measurement overlapping with the Raman peak derived from the ATR prism 200.

Figure 6:
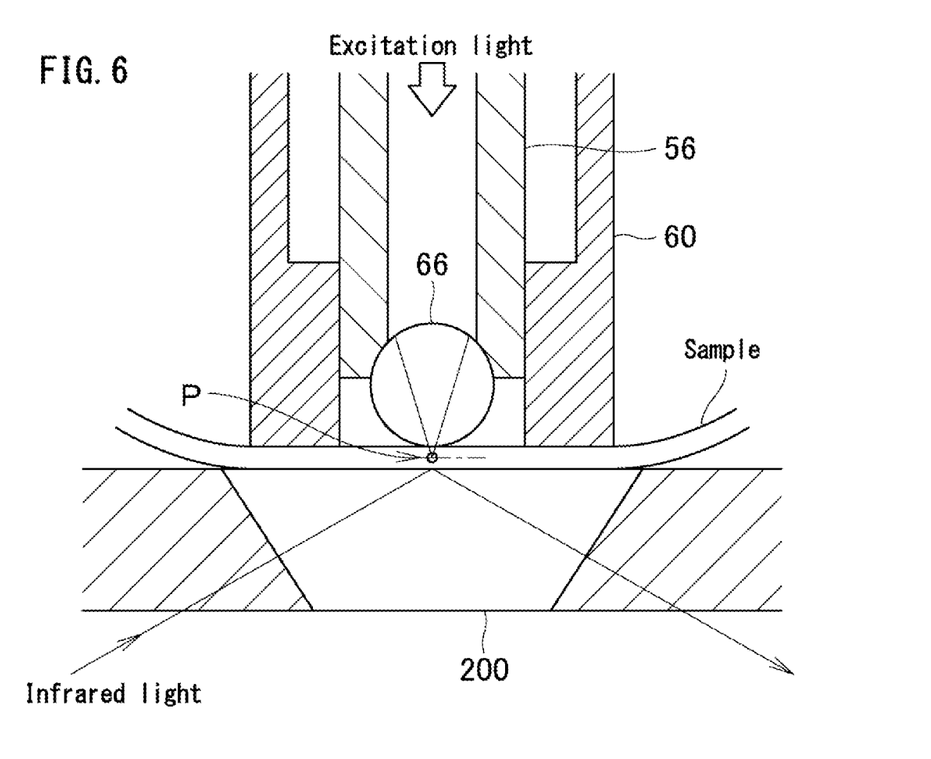
FIG. 6 illustrates an example of applying a ball lens to the Raman module.
Figure 7:
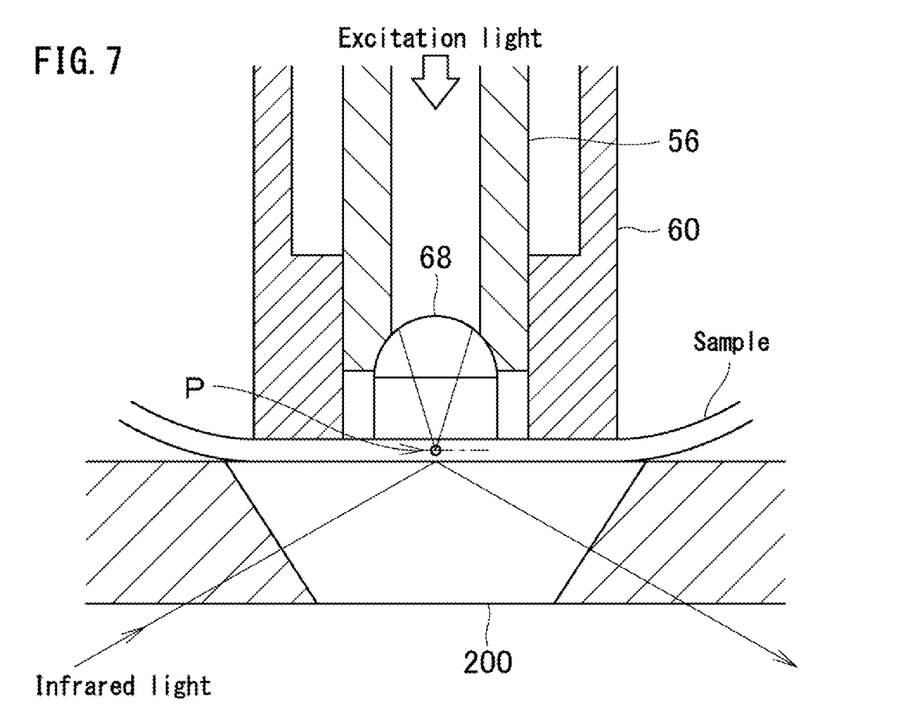
FIG. 7 illustrates an example of applying a half-ball lens to the Raman module.

Whereas, an embodiment using a lens portion having a different shape is illustrated in FIG. 6 and FIG. 7. In FIG. 6, a ball lens 66 is fixed to the end of the lens tube 56, and a part of the ball lens 66 is protruded from the lens tube 56 to the lower side. The ball lens 66 has a large numerical aperture and a short back focus (BFL), so that sensitivity and spatial resolution are increased. That is, since the distance from the lower end of the ball lens 66 to the focusing point P is short, the position of the focusing point P can be set not to deviate from the sample even if the position of the ball lens 66 is lowered by the focus adjustment mechanism 40 to bring the ball lens 66 in contact with the sample.

Similarly, since a half-ball lens (e.g., a solid immersion lens (SIL)) 68 has a large numerical aperture and a short back focus (BFL) too, Raman spectral measurement in a contact state with the sample can be performed like the ball lens 66. Moreover, the half-ball lens 68 can be in surface contact with the sample, not point contact like the ball lens 66. FIG. 7 illustrates a half-ball lens having a combined shape of a hemispherical shape and a cylindrical shape as an example.

Both of the guide tube 60 and the lens portion can be brought into contact with the sample by using the ball lens 66 and the half-ball lens 68, so that the contact state of the sample and the ATR prism 200 can be made more precise, and a better result of ATR measurement can be achieved.

Figure 8A:
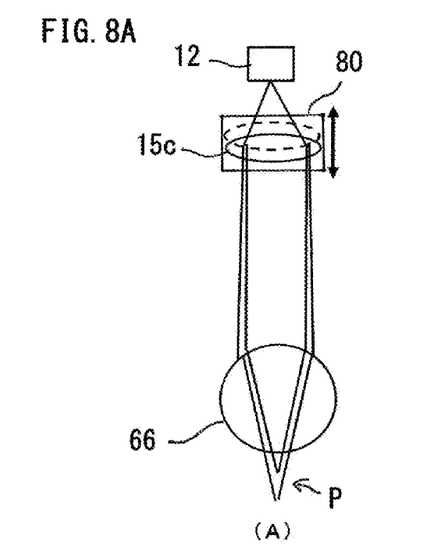
FIG. 8A illustrates a mechanism for moving the focusing point in the direction of the optical axis while the sample is pressed.
Figure 8B:
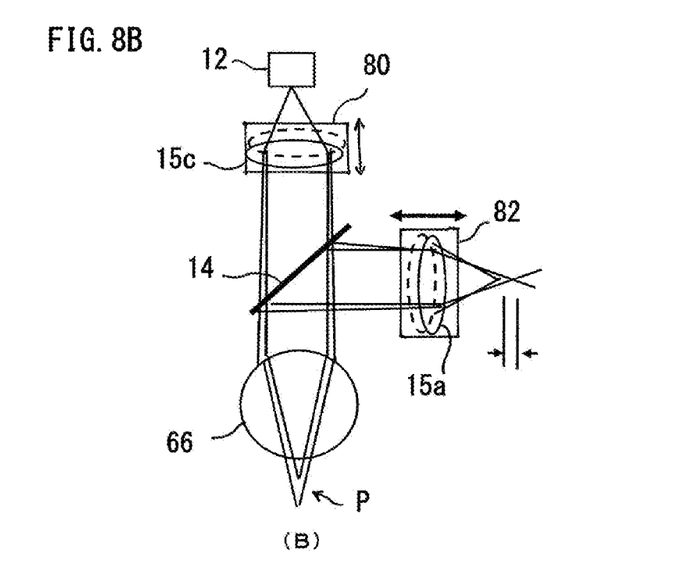
FIG. 8B illustrates a mechanism for moving the focusing point in the direction of the optical axis while the sample is pressed.

FIG. 8 illustrates an example of the Raman module 10 provided with a collimating lens position adjustment mechanism 80 of the collimating lens 15c, and an imaging lens position adjustment mechanism 82 of the imaging lens 15a. When the lens tube 56 having the ball lens 66 or the half-ball lens 68 is used, as shown in FIG. 8A, the position of the focusing point P of the ball lens 66 can be changed without operating the focus adjustment mechanism 40 by operating the collimating lens position adjustment mechanism 80 to move the position of the collimating lens 15c at the exit of the excitation light source 12 in a direction of the optical axis of the excitation light. In this case, since the image formation position at the slit 15b of the spectroscope 16 moves too, the position of the collimating lens 15c and the position of the imaging lens 15a disposed in front of the slit of the spectroscope 16 need to be synchronized. Accordingly, by providing the imaging lens position adjustment mechanism 82 that adjusts the position of an imaging lens 15a in a direction of the optical axis of the Raman scattering light like in FIG. 8B, the image formation position can be adjusted to the position of the slit 15b even if the position of the focusing point P of the ball lens 66 is moved. When using not only the convex lens 58 but also the lens tube 56 with the ball lens 66 or the half-ball lens 68, the position of the focusing point P in the depth (optical axis) direction can be changed while the sample is pressed.

<Exchangeability>

As shown in FIG. 3, one or more of a ball plunger 70 is embedded to the inner surface of the through hole 54 of the movable material 44. The ball plunger 70 is configured of a spring and a ball, and is retained such that a part of the ball is protruded from the inner surface of the through hole by a spring force. Moreover, a groove corresponding to the ball of the ball plunger 70 is formed at a circumference in the vicinity of the upper end of the lens tube 56. When the lens tube 56 is pressed into the through hole 54, the ball fits into the groove and the lens tube 56 becomes retained to the movable material 44. Moreover, when the lens tube 56 is pulled with a specific force, the fitted state of the ball and the groove becomes released, and the lens tube 56 is removed from the through hole 54. As described, the lens tube 56 can be easily mounted and released to/from the movable material 44.

Similarly, a detachable structure using the ball plunger 70 is adopted between the through hole 46 of the fixing material 42 and the guide tube 60, and the guide tube 60 can be easily mounted and released.

Figure 9:
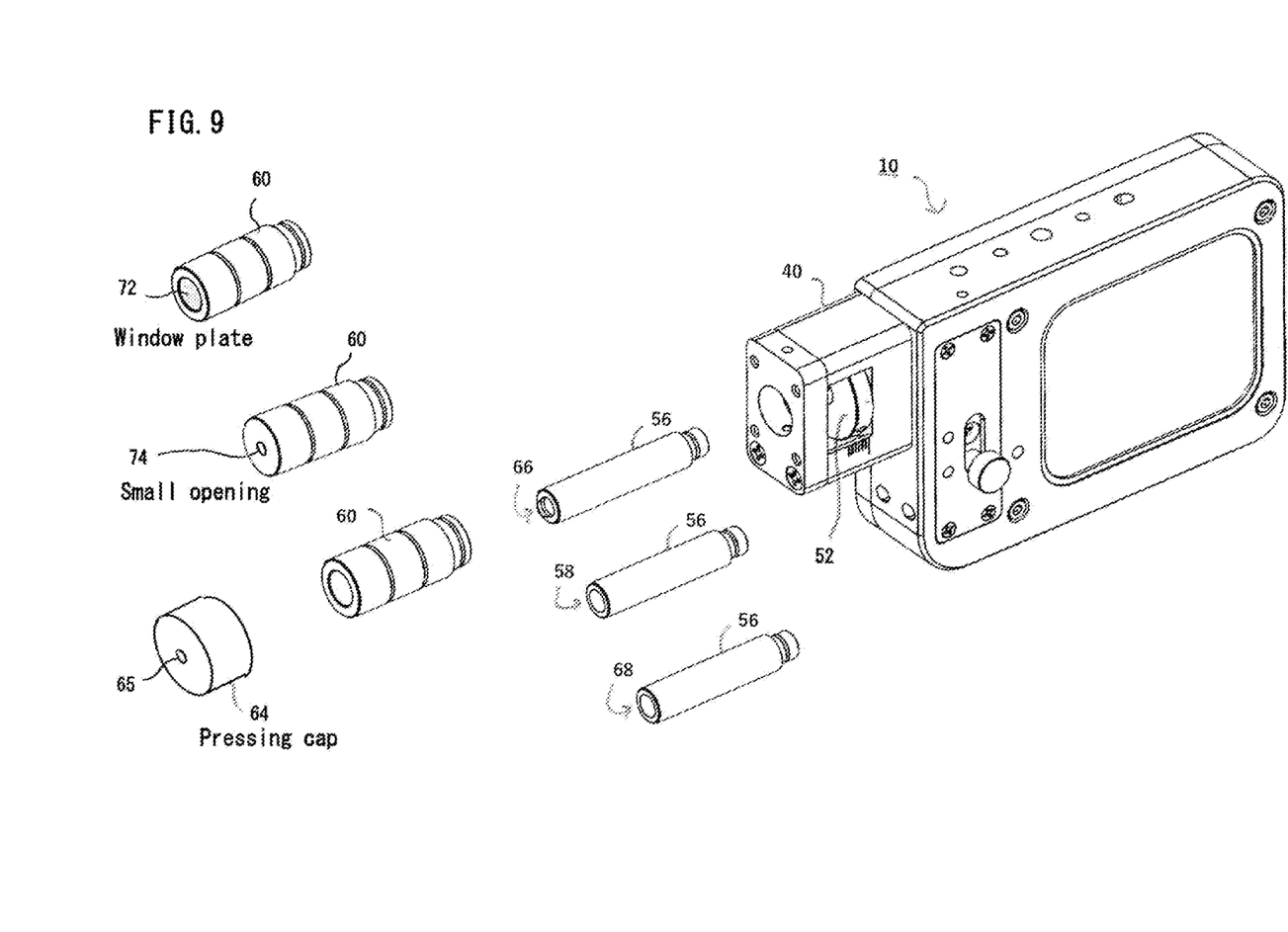
FIG. 9 illustrates a state when the guide tube and the lens tube are removed from the Raman module.

FIG. 9 illustrates a state which the lens tube 56 and the guide tube 60 are removed from the focus adjustment mechanism 40. Moreover, the pressing cap 64 removed from the guide tube 60 is also illustrated. By suitably selecting and using such detachable lens tube 56, guide tube 60, and pressing cap 64, they can be easily exchanged, and also can be easily changed to a tube of different length. Moreover, as shown in FIG. 9, the lens tube 56 can be easily selected and exchanged from a plurality of types of lens portions (convex lens 58, ball lens 66, half-ball lens 68). Moreover, as for the guide tube 60, the material or shape of the pressing part at the end can be easily changed in accordance with the sample like the pressing cap 64. Examples of the guide tube 60 provided with a small opening 74 at the end and the guide tube 60 provided with the window plate 72 are also illustrated in FIG. 9.

The elevating equipment 240 can be elevated/descended electrically, not manually, and the focus adjustment mechanism 40 can be driven electrically, not manually.

Moreover, as shown in FIG. 1, a camera 230 that images the ATR prism 200 from lower side may be provided. The camera 230 images a visible light image of the sample through the ATR prism 200. The visible light image of the sample is useful in adjusting position of the measurement part of the sample. Furthermore, it is also useful in positioning the focusing point P of the excitation light for Raman spectral measurement in the optical axis direction, and adjusting the measurement part of the sample to the focusing point P of the excitation light.

REFERENCE SIGNS LIST

10 Raman module (Raman spectroscopy instrument)
12 Excitation light source
15a Imaging lens
15c Collimating lens
16 Spectroscope
40 Focus adjustment mechanism (lens position adjustment mechanism)
42 Fixing material
44 Movable material
56 Lens tube
58 Convex lens (lens portion)
60 Guide tube
66 Ball lens (lens portion)
68 Half-ball lens (lens portion)
80 Collimating lens position adjustment mechanism
82 Imaging lens position adjustment mechanism
100 ATR accessory (Attenuated total reflection measuring apparatus)
200 ATR prism (ATR crystal)
220 Infrared optical instrument
300 Fourier-transform infrared spectrometer (FTIR)

The invention claimed is:

1. An Attenuated total reflection measuring apparatus that performs Attenuated total reflection measurement by bringing an Attenuated total reflection crystal (ATR crystal) having a refractive index higher than that of a sample into contact with the sample, the apparatus comprising an infrared optical instrument and a Raman spectroscopy instrument, wherein:
    the infrared optical instrument is disposed on the ATR crystal side of the sample, and is provided to irradiate the ATR crystal with an infrared light and collect the infrared light from the ATR crystal;
    the Raman spectroscopy instrument is disposed on a side opposite to the ATR crystal side relative to the sample, and comprises an excitation light source that emits an excitation light, a guide tube having a cylindrical shape that outputs the excitation light from an end of the guide tube to the sample, and a lens portion that is disposed inside the guide tube and collects the excitation light toward the end of the guide tube;
    the end of the guide tube is provided at a position to push the sample to the ATR crystal; and
    the Raman spectroscopy instrument further comprises a lens position adjustment mechanism for moving the lens portion along an excitation optical axis of the excitation light, and a spectroscope provided to spectrally disperse a Raman scattering light collected by the lens portion from the sample to detect the spectrally dispersed Raman scattering light.

2. The Attenuated total reflection measuring apparatus of claim 1, wherein
    the lens portion is fixed to a lens tube configuring a double cylindrical structure with the guide tube,
    the lens position adjustment mechanism comprises a movable material that moves along the excitation optical axis, and a fixing material that supports the movable material,
    the lens tube is retained to the movable material, and
    the guide tube is retained to the fixing material.

3. The Attenuated total reflection measuring apparatus of claim 2, wherein the lens tube is provided such that the position of the lens tube can be adjusted by the lens position adjustment mechanism so that the lens portion fixed to the end of the lens tube or the end of the lens tube comes into a position to push the sample to the ATR crystal.

4. The Attenuated total reflection measuring apparatus of claim 2, wherein the lens tube is detachably retained to the movable material, and the guide tube is detachably retained to the fixing material.

5. The Attenuated total reflection measuring apparatus of claim 1, wherein the lens position adjustment mechanism is configured such that the position of the sample and the position of the ATR crystal are within an adjustment range of the position of a focusing point of the lens portion.

6. The Attenuated total reflection measuring apparatus of claim 1, wherein the shape of the lens portion is a hemisphere or a sphere, and
    the lens portion is provided to be position adjustable by the lens position adjustment mechanism such that the lens portion comes into a position to push the sample to the ATR crystal.

7. The Attenuated total reflection measuring apparatus of claim 6, wherein the Raman spectroscopy instrument comprises:
    a collimating lens position adjustment mechanism that adjusts the position of a collimating lens disposed at an exit of the excitation light source in a direction of the optical axis of the excitation light; and
    an imaging lens position adjustment mechanism that adjusts the position of an imaging lens disposed in front of the spectroscope in a direction of the optical axis of the Raman scattering light.

* * * * *